US008109290B2

(12) United States Patent
Sato et al.

(10) Patent No.: US 8,109,290 B2
(45) Date of Patent: Feb. 7, 2012

(54) PIPE JOINT

(75) Inventors: Motohiro Sato, Toride (JP); Shuichi Saito, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 795 days.

(21) Appl. No.: 11/857,663

(22) Filed: Sep. 19, 2007

(65) Prior Publication Data
US 2008/0067804 A1     Mar. 20, 2008

(30) Foreign Application Priority Data
Sep. 20, 2006   (JP) ................................. 2006-254445

(51) Int. Cl.
*F16L 37/32* (2006.01)
(52) U.S. Cl. ................................ 137/614.04; 251/149.6
(58) Field of Classification Search ..... 137/614–614.05; 251/149.1, 149.6
See application file for complete search history.

(56) References Cited

U.S. PATENT DOCUMENTS

| 166,489 | A | * | 8/1875 | Westinghouse | 137/614.04 |
|---|---|---|---|---|---|
| 2,643,140 | A | * | 6/1953 | Scheiwer | 137/614.04 |
| 2,687,314 | A | * | 8/1954 | Kaiser | 137/614.02 |
| 2,823,048 | A | * | 2/1958 | Hansen | 251/149.6 |
| 2,854,259 | A | * | 9/1958 | Clark | 137/614.03 |
| 2,931,668 | A | * | 4/1960 | Baley | 137/614.04 |
| 2,983,526 | A | * | 5/1961 | Abbey et al. | 137/614.04 |
| 3,097,867 | A | * | 7/1963 | Saloum | 137/614.03 |
| 3,139,110 | A | * | 6/1964 | Bales | 137/614.04 |
| 3,236,251 | A | * | 2/1966 | Hansen | 137/614.05 |
| 3,291,152 | A | * | 12/1966 | Comer | 137/614.04 |
| 3,336,944 | A | * | 8/1967 | Anderson et al. | 137/614.04 |
| 3,367,366 | A | * | 2/1968 | Klatte et al. | 137/614.05 |
| 3,446,245 | A | * | 5/1969 | Snyder, Jr. | 137/614.03 |
| 3,525,361 | A | * | 8/1970 | Jeromson, Jr. et al. | 137/614.04 |
| 3,570,543 | A | * | 3/1971 | Ekman | 137/614.04 |
| 3,586,047 | A | * | 6/1971 | Ehrenberg | 137/614.04 |
| 3,788,348 | A | * | 1/1974 | Johnson | 137/614.04 |
| 4,313,594 | A | * | 2/1982 | Antoniw et al. | 137/614.02 |
| 4,625,761 | A | * | 12/1986 | Uchida et al. | 137/614.03 |
| 4,733,692 | A | * | 3/1988 | Kotake et al. | 137/614.03 |
| 4,971,110 | A | * | 11/1990 | Cato | 137/614.04 |
| 4,986,304 | A | * | 1/1991 | Vanderjagt | 137/614.02 |
| 5,088,519 | A | * | 2/1992 | Giroux et al. | 137/614.01 |
| 5,213,309 | A | * | 5/1993 | Makishima | 251/149.6 |
| 5,316,041 | A | * | 5/1994 | Ramacier et al. | 137/614.04 |
| 5,355,909 | A |   | 10/1994 | Smith |  |
| 5,494,074 | A | * | 2/1996 | Ramacier et al. | 137/614.04 |
| 5,546,985 | A | * | 8/1996 | Bartholomew | 137/614.04 |
| 5,566,714 | A | * | 10/1996 | Miller | 137/614.04 |
| 5,810,048 | A | * | 9/1998 | Zeiner-Gundersen | 137/614.04 |

(Continued)

FOREIGN PATENT DOCUMENTS
DE         835 968         4/1952
(Continued)

*Primary Examiner* — Kevin Lee
*Assistant Examiner* — Craig J Price
(74) *Attorney, Agent, or Firm* — Paul A. Guss

(57) ABSTRACT

A pipe joint is equipped with a socket and a plug, which are attachable and detachable from each other, wherein a pressure fluid introduced from the plug flows toward the socket through second holes formed in a plug valve. In addition, the pressure fluid flows smoothly along outer circumferential surfaces of the plug valve and a socket valve, and along inner circumferential surfaces of a plug body and a socket body. Further, the pressure fluid flows from the socket body to a back body, through first holes formed in the socket valve.

10 Claims, 10 Drawing Sheets

U.S. PATENT DOCUMENTS

| | | | | |
|---|---|---|---|---|
| 5,971,019 | A * | 10/1999 | Imai | 137/614.04 |
| 6,050,297 | A * | 4/2000 | Ostrowski et al. | 137/614.04 |
| 6,217,080 | B1 * | 4/2001 | Imai | 137/614.06 |
| 6,302,147 | B1 * | 10/2001 | Rose et al. | 137/614.03 |
| 6,371,443 | B1 * | 4/2002 | Imai | 251/149.6 |
| 6,463,957 | B1 * | 10/2002 | Ozawa | 137/614.04 |
| 6,588,452 | B2 * | 7/2003 | Marquart | 137/614 |
| 6,871,837 | B2 * | 3/2005 | Mikiya et al. | 251/149.1 |
| 6,886,803 | B2 * | 5/2005 | Mikiya et al. | 251/149.1 |
| 7,028,983 | B2 * | 4/2006 | Ozaki et al. | 251/149.6 |
| 7,168,449 | B2 * | 1/2007 | Giagnoli et al. | 137/614.04 |
| 7,213,845 | B2 | 5/2007 | Sato et al. | |
| 7,472,888 | B2 * | 1/2009 | Nishio et al. | 251/149.6 |
| 7,722,010 | B2 * | 5/2010 | Nishio et al. | 251/149.6 |
| 2001/0052366 | A1 * | 12/2001 | Ozawa | 137/614.04 |
| 2005/0103387 | A1 * | 5/2005 | Voege et al. | 137/614.04 |

FOREIGN PATENT DOCUMENTS

| | | |
|---|---|---|
| GB | 708527 | 5/1954 |
| JP | 47-42011 | 12/1972 |
| JP | 62-13289 | 1/1987 |
| JP | 11-193894 | 7/1999 |
| JP | 11-201358 | 7/1999 |
| JP | 2003-202096 | 7/2003 |
| JP | 2005-069446 | 3/2005 |
| JP | 2005-172192 | 6/2005 |
| JP | 2005-315420 | 11/2005 |
| JP | 2006-125490 | 5/2006 |
| KR | 1992-0005280 | 7/1992 |
| KR | 1995-0002531 | 4/1995 |

* cited by examiner

PIPE JOINT

BACKGROUND OF THE INVENTION

1. Field of the Invention

The present invention relates to a pipe joint enabling the connection of pipes for introduction and discharge of fluids therethrough, and more specifically to a pipe joint equipped with a socket and plug attachment/detachment mechanism.

2. Description of the Related Art

Heretofore, a pipe joint equipped with an attachment/detachment mechanism facilitating detachment of a socket and plug has been used. With such a pipe joint, in a state in which the socket and plug are detached from each other, so that fluid does not flow outwardly therefrom, both the socket and plug sides are equipped with check valves therein. Thus, when the socket and plug are detached from each other, the check valves assume valve-closed states, so that leakage of fluid to the outside is prevented. (See, Japanese Utility Model Publication No. 47-42011, Japanese Laid-Open Utility Model Publication No. 62-13289, and Japanese Laid-Open Patent Publication No. 2003-202096.)

However, in the conventional art described in Japanese Utility Model Publication No. 47-42011 and Japanese Laid-Open Utility Model Publication No. 62-13289 and Japanese Laid-Open Patent Publication No. 2003-202096, the flow passage through which the fluid flows is guided radially outwardly from a side of the connecting end of the plug and is divided into a plurality of flow passages. Thereafter, the flow passage is guided radially inwardly through an annular flow passage, changing once again radially outwardly while being divided into a plurality of passages, and is connected to the connecting end side of the socket. In the case of such a complex flow passage shape, the fluid flows through the pipe joint while colliding against wall surfaces perpendicular to the flow direction of the fluid as well as against wall surfaces that are inclined with respect to the flow direction, and as a result, fluid passage resistance becomes large, the flow direction of the fluid becomes disturbed, and pressure loss occurs.

Further, in the conventional art described in Japanese Utility Model Publication No. 47-42011, Japanese Laid-Open Utility Model Publication No. 62-13289 and Japanese Laid-Open Patent Publication No. 2003-202096, because a structure is provided equipped with a spring on an inner circumferential side of a sleeve, the outer circumferential diameter of the sleeve is enlarged to accommodate the spring portion, and together therewith, the pipe joint tends to become increased in size overall.

Furthermore, when the check valves are assembled in the interior of the socket and plug, since the check valves are inserted into the interior from sides of the connection ends of the socket and plug respectively, a limitation is placed on the size of the check valves that can be assembled therein owing to the opening diameters of the connection ends, such that check valves having desirable sizes cannot be assembled therein.

SUMMARY OF THE INVENTION

A general object of the present invention is to provide a pipe joint that enables stable operation of the valve body, and further, which enables the pipe joint to be reduced in size, along with suppressing fluid passage resistance and reducing pressure loss when a fluid flows therethrough.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
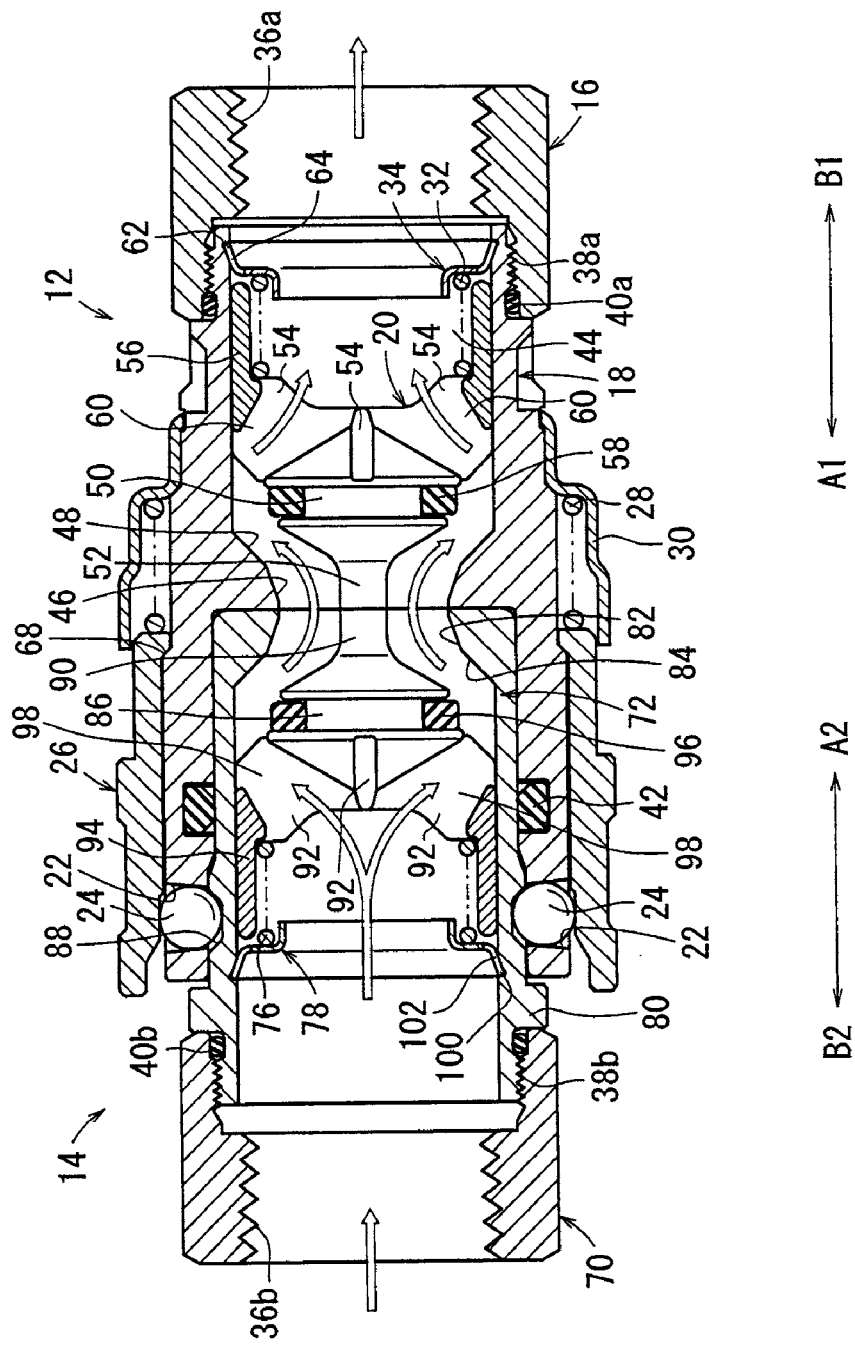
FIG. 1 is an overall vertical cross sectional view showing a connected state of a pipe joint according to a first embodiment of the present invention.

In FIG. 1, the reference numeral 10 indicates a pipe joint according to a first embodiment of the present invention.

The pipe joint 10, as shown in FIGS. 1 through 5, includes a socket 12 and a plug 14 connectable to the socket 12. First, the socket 12 shall be described, while referring to FIG. 2, which shows a detached state of the socket 12 and plug 14. In such a detached state, the socket 12 and plug 14 are in a state of being separated from each other (see FIG. 2), whereas conversely (see FIG. 1), in an attached state the respective fluid passages of the socket 12 and plug 14 are in a state of communication with each other. Further, in the following description, in order to define the directions of the socket 12 and plug 14, the sides thereof through which the socket 12 and plug 14 are mutually connected (in the directions of the arrows A1 and A2) shall be referred to as front ends, and the directions on the opposite sides thereof, which are connected to piping or the like (in the directions of the arrows B1 and B2), shall be referred to as rear ends.

The socket 12 is formed in a tubular shape, and includes a first back body (connecting member) 16, a socket body (first body) 18 having a cylindrical shape coupled through threaded engagement with the first back body 16, a socket valve (valve body) 20 disposed displaceably inside of the socket body 18, a plurality of balls 24 arranged in the vicinity of the front end of the socket body 18 and inserted into a plurality of holes 22, a tubular sleeve 26 disposed so as to surround and cover the front end side of the socket body 18, a sleeve spring (first spring) 28 that urges the sleeve 26 in a direction toward the front end side, a sleeve cover (cover member) 30 covering the sleeve spring 28, and a first spring holder 34 disposed inside of the socket body 18, which retains a first valve spring (second spring) 32 that is interposed between the socket body 18 and the socket valve 20.

The rear end of the first back body 16 provides an opening, with a threaded portion 36a engraved therein on an inner circumferential surface thereof for threaded engagement with piping or the like, and which functions as a connection with the piping or the like.

Male threads 38a are engraved along the outer circumferential surface on the rear end of the socket body 18, so that the socket body 18 and the first back body 16 are connected integrally through threaded engagement of the back body 16 via the male threads 38a. Further, at the connected region of the socket body 18 and the first back body 16, an o-ring 40a is arranged in an annular groove formed on the outer circumferential surface of the socket body 18.

A seal member 42 is installed on the front end side of the socket body 18, via an annular groove formed on the inner circumferential surface thereof. When the socket 12 and the plug 14 are connected, the outer circumferential surface of the plug body 72 that constitutes the plug 14 abuts against the seal member 42. As a result, an airtight condition inside of the socket body 18 is maintained by the seal member 42.

Further, a plurality of holes 22 adjacent to the seal member 42 are formed on the front end side of the socket body 18, with each of the balls 24 being inserted respectively into the holes 22. The holes 22 are disposed at equal intervals along the circumferential surface of the socket body 18, wherein the balls 24 are maintained by inner circumferential surfaces of the holes 22, which are reduced in diameter toward the radial inner side of the socket body 18, such that portions of the balls 24 project toward the inner circumferential side of the socket body 18.

On the other hand, portions of the balls project outwardly from the holes 22 of the socket body 18 toward the radial outer side of the socket body 18, so that they are retained in a state of abutment with the inner circumferential surface of the sleeve 26, which is disposed on the outer circumferential side of the socket body 18. Specifically, owing to the tapered formation of the holes, the balls 24 do not drop toward the inner circumferential side of the socket body 18, and moreover, since the sleeve 26 is disposed so as to cover the outer circumferential side of the holes 22, the balls 24 are prevented from moving toward the outer circumferential side of the socket body 18. As a result, the balls 24 are suitably maintained with respect to the holes 22 of the socket body 18.

A first penetrating hole 44, which penetrates in an axial direction, is formed on an inside portion of the socket body 18. In the first penetrating hole 44, there are provided a first valve seat (valve seat part) 46 that projects radially inwardly and is disposed at a substantially central portion along the axial direction, and a first stopper wall 48 formed on a rear end side adjacent to the first valve seat 46.

The first valve seat 46 projects toward the front end side of the socket body while becoming gradually reduced in diameter. Through seating of a first seat of the socket valve 20, the communicating state provided by the first penetrating hole is blocked.

The first stopper wall 48 projects radially inwardly in the radial direction in the same manner as the first valve seat 46, and is inclined at a predetermined angle so as to gradually expand in diameter from the first valve seat 46 toward the rear end side of the socket body 18. Specifically, the first valve seat 46 and the first stopper wall 48 are formed so as to be reduced in diameter at mutually different angles toward the front end side. In even greater detail, the angle of the first valve seat 46 with respect to the axis of the socket body 18 is set to be smaller than the angle of the first stopper wall 48 with respect to the axis.

The socket valve 20 is substantially cylindrical in shape, including a disk-shaped first seat defined by an annular groove 50 that accommodates a first valve packing 58, which is capable of being seated on the first valve seat 46 of the socket body 18, a first projection 52 that is gradually reduced in diameter from the first seat 50 and projects toward the front end side of the socket body 18, first stoppers 54 that gradually expand in diameter from the first seat 50 toward the rear end side of the socket body 18, and which are capable of abutment with the first stopper wall 48, and a first skirt 56 adjacent to the first stoppers 54, which abuts against the inner wall surface of the first penetrating hole 44.

The first seat is formed at an angle that corresponds with the angle of inclination of the first valve seat 46, and the first valve packing 58 is installed in the annular groove 50, which is formed along the outer circumferential surface thereof. More specifically, when the socket valve 20 is seated on the first valve seat 46, the first valve packing 58 of the first seat abuts against the first valve seat 46, whereby communication of the pressure fluid that passes through the first valve seat 46 in the first penetrating hole 44 is reliably cut off.

The first projection 52 has a substantially constant diameter, and is disposed on the axis of the socket body 18. In addition, the end of the first projection 52 facing the plug 14 is formed in a planar shape.

The first stoppers 54 are formed in a plate shape (in the shape of a pillar or column) along the axial direction, each having a straight face with a rectangular portioned shape, so as to interconnect the first seat and the first skirt 56. A plurality (e.g., four) of the first stoppers 54 are arranged upstandingly at equal intervals along the circumferential direction of the socket valve 20. The first stoppers 54 are formed at an angle that corresponds with the angle of inclination of the first stopper wall 48. When the socket valve 20 is displaced toward the first valve seat 46 (in the direction of the arrow A1), the first stoppers 54 abut against and are stopped by engagement with the first stopper wall 48. Specifically, displacement toward the forward end side of the socket body 18 of the socket valve 20 is regulated, and by abutment of the first stoppers 54 against the first stopper wall 48, which is formed with a tapered shape, the first projection 52 is guided to coincide with the axis of the socket body 18. As a result, when the socket valve 20 is seated on the first valve seat 46, the socket valve 20 is positioned so as to normally be arranged on the axis of the socket body 18.

Further, in the socket valve 20, because the first seat and the first skirt 56 are connected via the plurality of first stoppers 54, which are mutually separated from one another in the circumferential direction, the pressure fluid can flow through first holes (communication holes) 60 defined between the first stoppers 54.

The outer circumferential surface of the first skirt 56 is formed in a cylindrical shape, abutting against the inner circumferential surface of the first penetrating hole 44. When the socket valve 20 is displaced in the axial direction, the first skirt 56 is guided along an inner circumferential surface of the first penetrating hole 44.

The first valve spring 32 is interposed between the first spring holder 34 and a region of engagement between the first skirt 56 and the first stoppers 54 with one end of the first valve spring 32 being maintained at the region. As a result, the socket valve 20 is normally urged by the resilient force of the first valve spring 32 toward the first valve seat 46 (in the direction of the arrow A1).

The first spring holder 34 is disposed at the rear end side (in the direction of the arrow B1) of the annularly shaped socket body 18. The first spring holder 34 extends toward the side of the first back body 16 (in the direction of the arrow B1), and has a plurality of (for example twelve) legs 62 separated from each other at equal intervals in the circumferential direction. The legs 62 are formed so as to expand gradually in diameter radially outwardly with respect to the axis of the first spring holder 34, and to engage with the inner circumferential surface of the socket body 18. In addition, the first penetrating hole 44 of the socket body 18 communicates with the first back body 16 through first communication holes 64, which are formed in between each of the plural legs 62.

Further, on the first spring holder 34, the end thereof facing the socket valve 20 is reduced in diameter with respect to the legs 62, and the first valve spring 32 is interposed at the planar region between the legs 62 and the end.

The inner circumferential surface at the end of the sleeve 26 is formed with a stepped portion 66, which is expanded in diameter in a radial outward direction. The balls 24 maintained within the socket body 18 abut against and engage with the stepped portion 66.

Further, the rear end of the sleeve 26 projects radially inwardly and engages with a stepped portion 68 formed on the outer circumferential surface of the socket body 18. As a result, displacement of the sleeve 26 toward the front end of the socket body 18 (in the direction of the arrow A1) is regulated. Furthermore, a sleeve spring 28 is interposed between the sleeve cover 30 installed on the outer circumferential surface of the socket body 18 and the rear end of the sleeve 26, such that the sleeve 26 is normally urged toward the front end of the socket body 18. In this case, through engagement of the sleeve 26 on the stepped portion 68 of the socket body 18, detachment thereof from the socket body 18 is prevented.

Next, the plug 14 in a detached state shall be explained with reference to FIG. 2.

The plug 14 has a cylindrical form, including a second back body (connecting member) 70 connected to an unillustrated piping or the like, a cylindrical plug body (second body) 72 connected through threaded engagement with respect to the second back body 70, a plug valve (valve body) 74 comprised of a displacement member disposed inside of the plug body 72, a second valve spring (second spring) 76 interposed between the plug valve 74 which urges the plug valve 74, and a second spring holder 78 for retaining an end of the spring within the plug 14.

The second back body 70 has substantially the same form as the first back body 16, and is screw-engaged with male threads 38b engraved on the rear end of the plug body 72. As a result, the plug body 72 and the second back body 70 are integrally coupled together. Moreover, at the region where the plug body 72 and the second back body 70 are coupled together, an o-ring 40b is installed via an annular groove formed on the outer circumferential surface of the plug body 72.

At the interior of the plug body 72, a second penetrating hole 80 that penetrates in the axial direction is formed, and in the second penetrating hole 80, there are disposed a second valve seat (valve seat part) 82 formed at a front end of the plug body 72 (in the direction of the arrow A2), and a second stopper wall 84 formed at the rear end adjacent to the second valve seat 82 (in the direction of the arrow B2).

The second valve seat 82 projects radially inwardly, so as to be reduced in diameter toward the front end side of the plug body 72 (in the direction of the arrow A2). Through seating of a second seat of the plug valve 74, the communicating state provided in the second penetrating hole 80 is blocked.

The second stopper wall 84 projects radially inwardly with respect to the inner circumferential surface of the plug body 72 in the same manner as the second valve seat 82, and is inclined at a predetermined angle so as to gradually expand in diameter from the second valve seat 82 toward the rear end side of the plug body 72. Specifically, the second valve seat 82 and the second stopper wall 84 are formed so as to be reduced in diameter at mutually different angles toward the front end side (in the direction of the arrow A2). In even greater detail, the angle of the second valve seat 82 with respect to the axis of the plug body 72 is set to be smaller than the angle of the second stopper wall 84 with respect to the axis.

Further, an annular groove 88 is formed on the outer circumferential surface of the plug body 72, for engagement of the balls 24 therein when the plug body 72 and the socket body 18 are connected.

The plug valve 74 is formed in a substantially cylindrical shape having substantially the same shape as the socket valve 20, and includes a disk-shaped second seat defined by an annular groove 86 that accommodates a second valve packing 96, which is capable of being seated on the second valve seat 82 of the plug body 72, a second projection 90 that is gradually reduced in diameter from the second seat and projects toward the front end side of the plug body 72 (in the direction of the arrow A2), second stoppers 92 that gradually expand in diameter from the second seat 8G toward the rear end side of the plug body 72 (in the direction of the arrow B2), and which are capable of abutment with the second stopper wall 84, and a second skirt 94 adjacent to the second stopper wall 84, which abuts against the inner wall surface of the second penetrating hole 80.

The second seat is formed at an angle that corresponds with the angle of inclination of the second valve seat 82, and the second valve packing 96 is installed in the annular groove, which is formed along the outer circumferential surface thereof. More specifically, when the plug valve 74 is seated on the second valve seat 82, the second valve packing 96 of the second seat abuts against the second valve seat 82, whereby communication of the pressure fluid that passes through the second valve seat 82 in the second penetrating hole 80 is cut off.

The second projection 90 has a substantially constant diameter, and is disposed on the axis of the plug body 72. The end thereof facing the socket 12 is formed in a planar shape. When the socket 12 and the plug 14 are connected, the second projection 90 is arranged such that it confronts the first projection 52 of the socket valve 20.

The second stoppers 92 are formed in a plate shape (in the shape of a pillar or column) along the axial direction, each having a straight face with a rectangular portioned shape, so as to interconnect the second seat and the second skirt 94. A plurality (e.g., four) of the second stoppers 92 are arranged upstandingly at equal intervals along the circumferential direction of the plug valve 74. The second stoppers 92 are formed at an angle that corresponds with the angle of inclination of the second stopper wall 84. When the plug valve 74 is displaced toward the second valve seat 82, the second stoppers 92 abut against and are stopped by engagement with the second stopper wall 84. Specifically, displacement of the plug valve 74 toward the forward end side of the plug body 72 is regulated, and by abutment of the second stoppers 92 against the second stopper wall 84 which is formed with a tapered shape, the second projection 90 is guided to coincide with the axis of the plug body 72. As a result, when the plug valve 74 is seated on the second valve seat 82, the plug valve 74 is positioned so as to normally be arranged on the axis of the plug body 72.

Further, in the plug valve 74, because the second seat and the second skirt 94 are connected via the plurality of second stoppers 92, which are mutually separated from one another in the circumferential direction, the pressure fluid can flow through second holes (communication holes) 98 defined between the second stoppers 92.

The outer circumferential surface of the second skirt 94 is formed in a cylindrical shape, abutting against the inner circumferential surface of the second penetrating hole 80. When the plug valve 74 is displaced in the axial direction, the second skirt 94 is guided along the inner circumferential surface of the second penetrating hole 80.

The second spring holder 78 is formed with substantially the same shape as the first spring holder 34, and is disposed at the rear end side (in the direction of the arrow B2) of the plug body 72. The second spring holder 78 extends toward the side of the second back body 70 (in the direction of the arrow B2), and has a plurality of (for example twelve) legs 100 separated from each other at equal intervals in the circumferential direction. The legs 100 are formed so as to expand gradually in diameter radially outwardly with respect to the axis of the second spring holder 78, and to engage with the inner circumferential surface of the plug body 72. In addition, the second penetrating hole 80 of the plug body 72 communicates with the second back body 70 through second communication holes 102, which are formed in between each of the plural legs 100.

Further, on the second spring holder 78, the end thereof facing the plug valve 74 is reduced in diameter with respect to the legs 100, and the second valve spring 76 is interposed at the planar region between the legs 100 and the end.

Further, an end of the second valve spring 76 is interposed between the second spring holder 78 and a region of engagement between the second skirt 94 and the second stoppers 92. As a result, the plug valve 74 normally is urged toward the second valve seat 82 (in the direction of the arrow A2) by an elastic force of the second valve spring 76.

The pipe joint 10 according to the first embodiment of the present invention is basically constructed as described above. Next, an explanation shall be given concerning a case in which the socket 12 and the plug 14 are connected to each other. Highly flexible hoses (not shown), for example, are connected to the first and second back bodies 16, 70 of the socket 12 and plug 14 through means of the threaded portions 36a, 36b that are engraved on the inner circumferential surfaces thereof. A pressure fluid (liquid or gas) is supplied and filled beforehand in the rear end sides (in the directions of arrows B1 and B2) of the socket 12 and plug 14.

Figure 2:
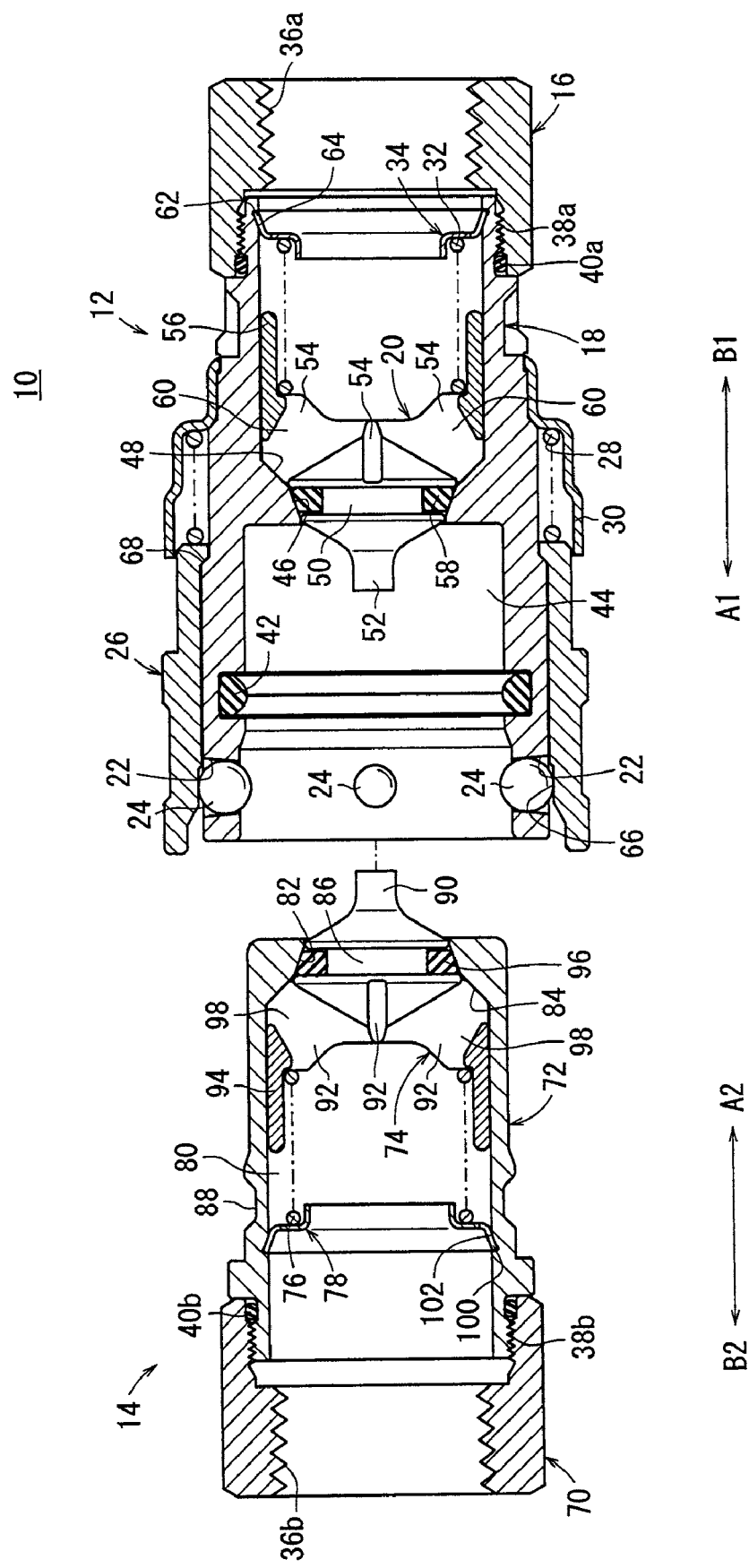
FIG. 2 is an overall vertical cross sectional view showing a detached state of a socket and plug, in the pipe joint shown in FIG. 1.
Figure 3:
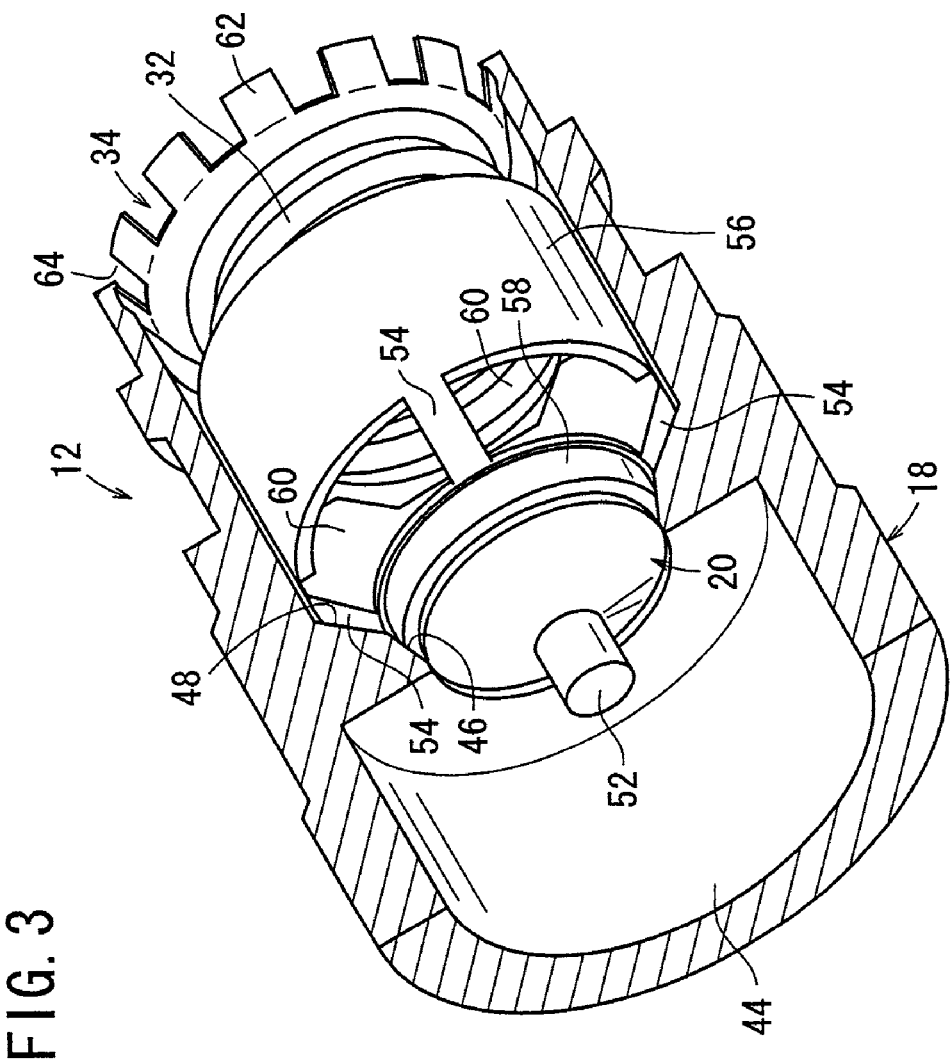
FIG. 3 is a sectional perspective view, with partial omission, of the socket shown in FIG. 2.
Figure 4:
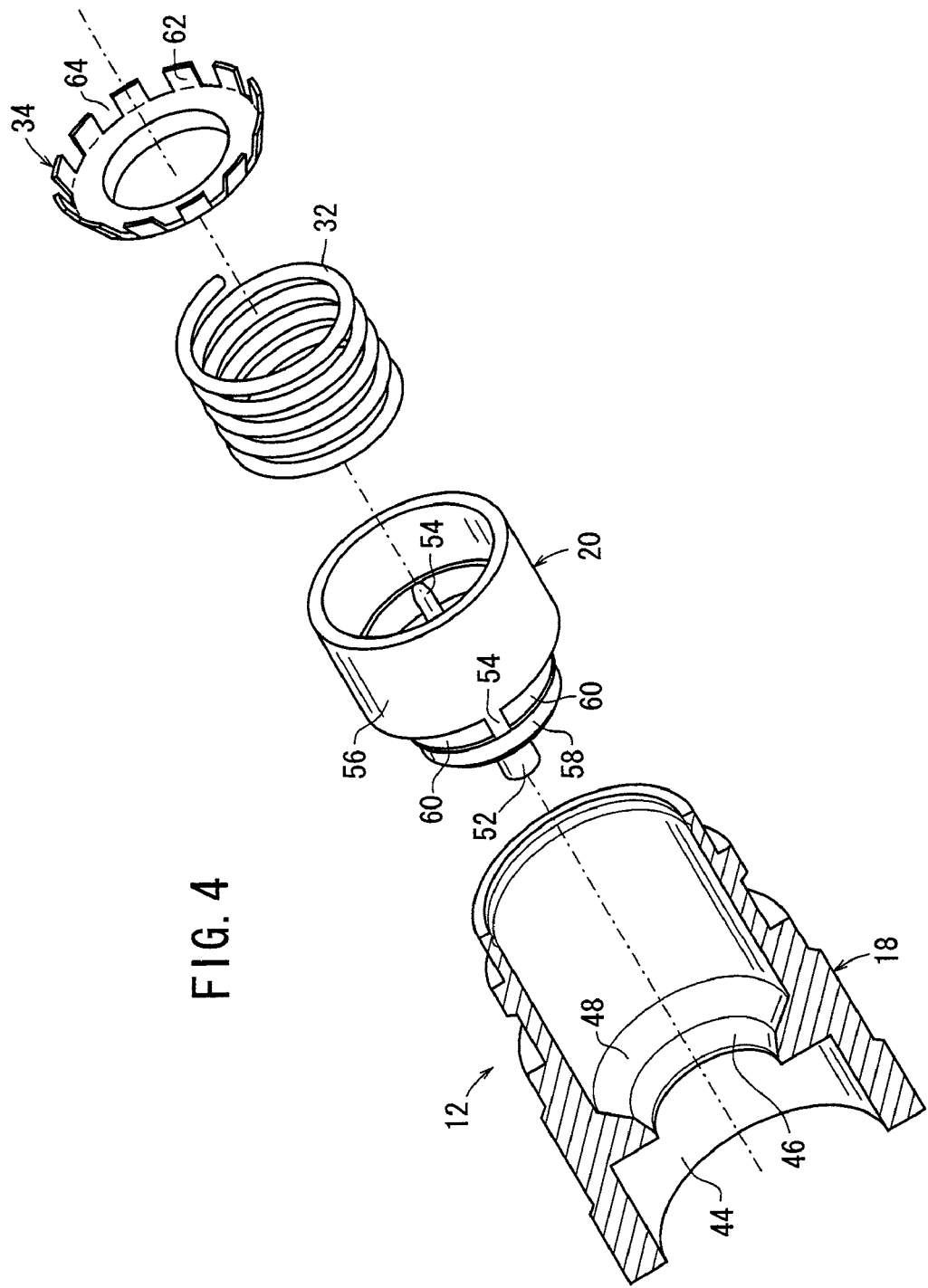
FIG. 4 is an exploded perspective view of a socket valve, a first valve spring and a first spring holder, constituting the socket shown in FIG. 2.
Figure 5:
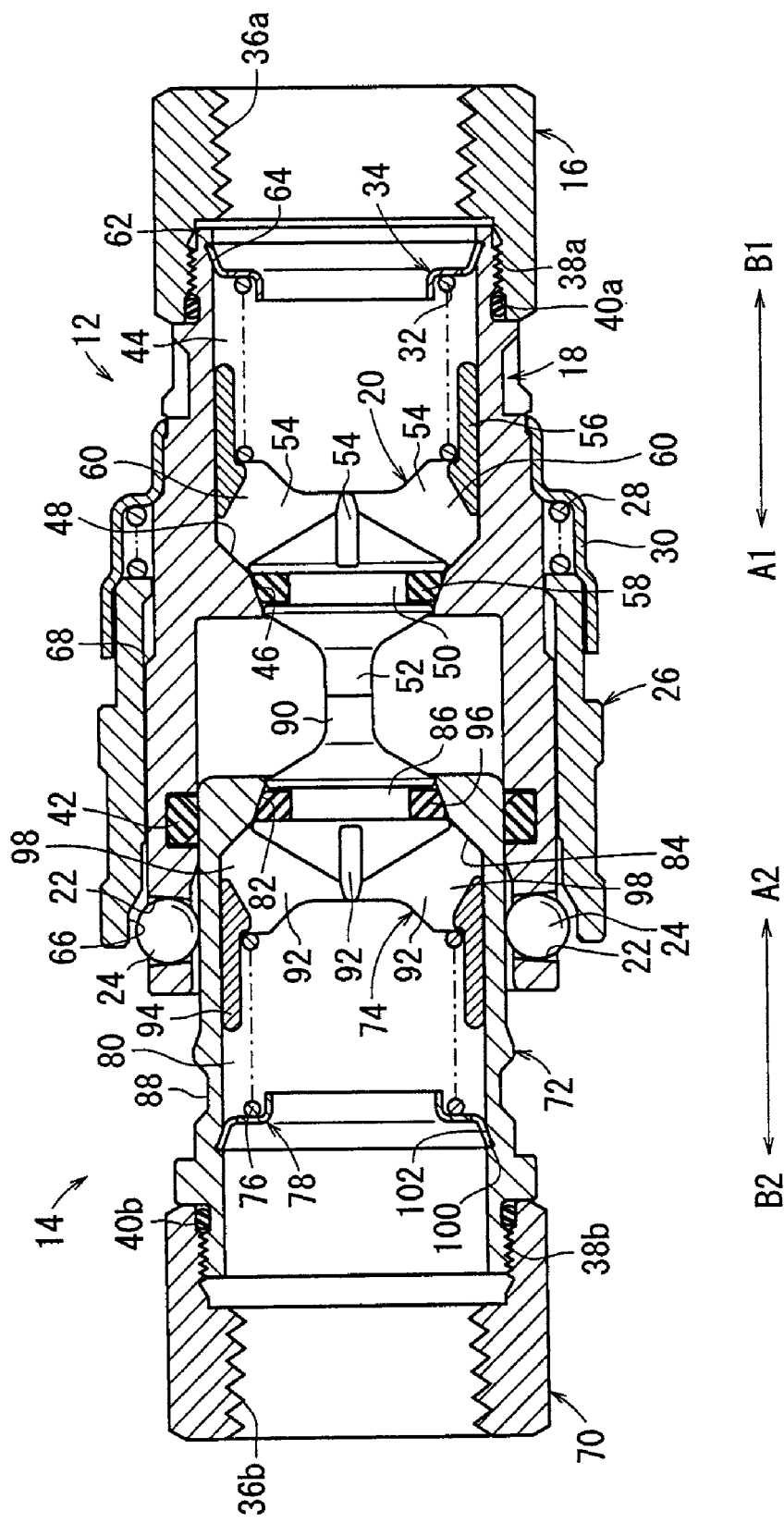
FIG. 5 is an overall vertical cross sectional view showing a state, during connection, wherein the socket and plug are moved mutually in directions to approach each other, and the socket valve and the plug valve abut against one another, in the pipe joint shown in FIG. 2.
Figure 6:
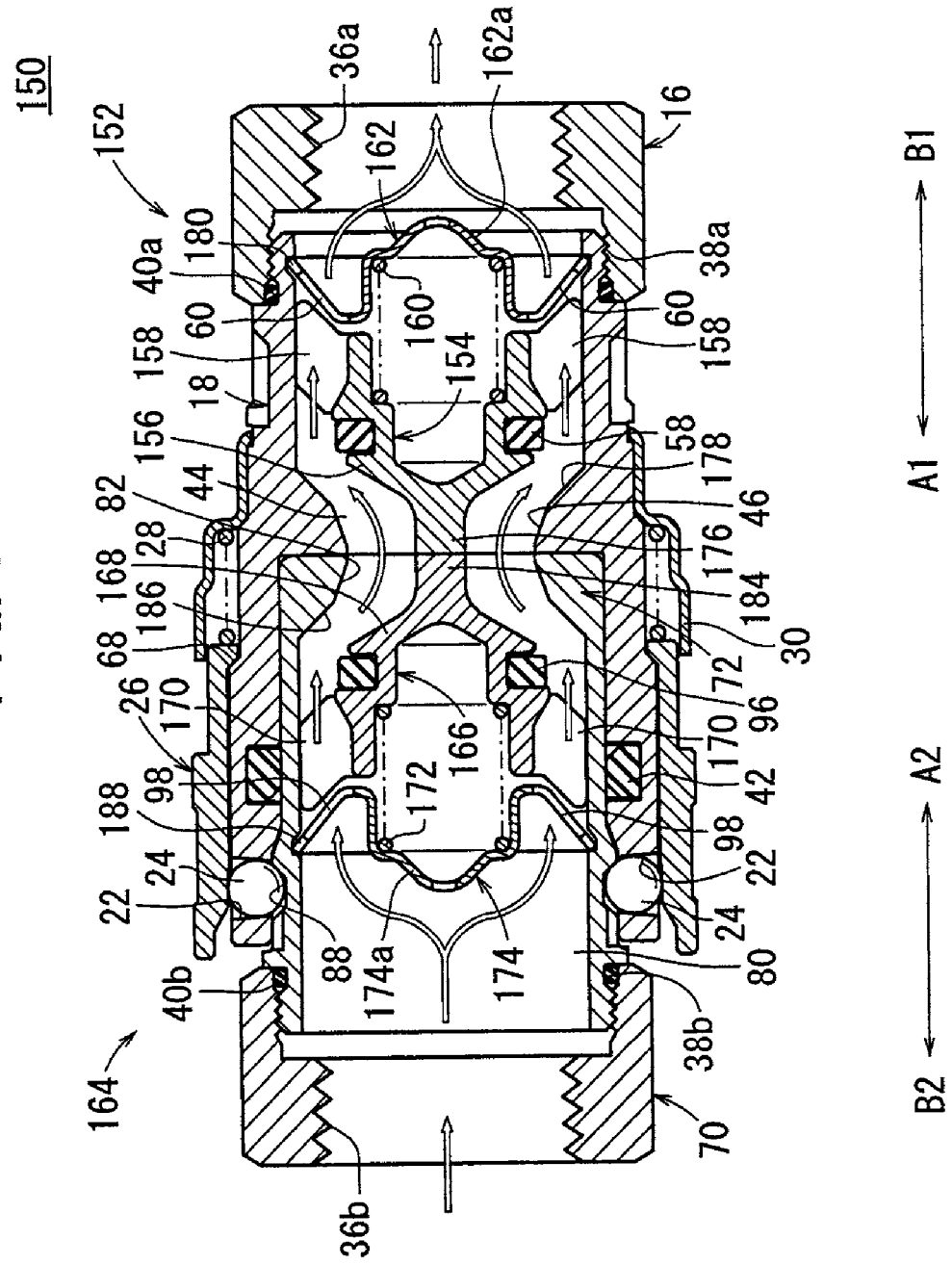
FIG. 6 is an overall vertical cross sectional view showing a connected state of the pipe joint according to a second embodiment of the present invention.
Figure 7:
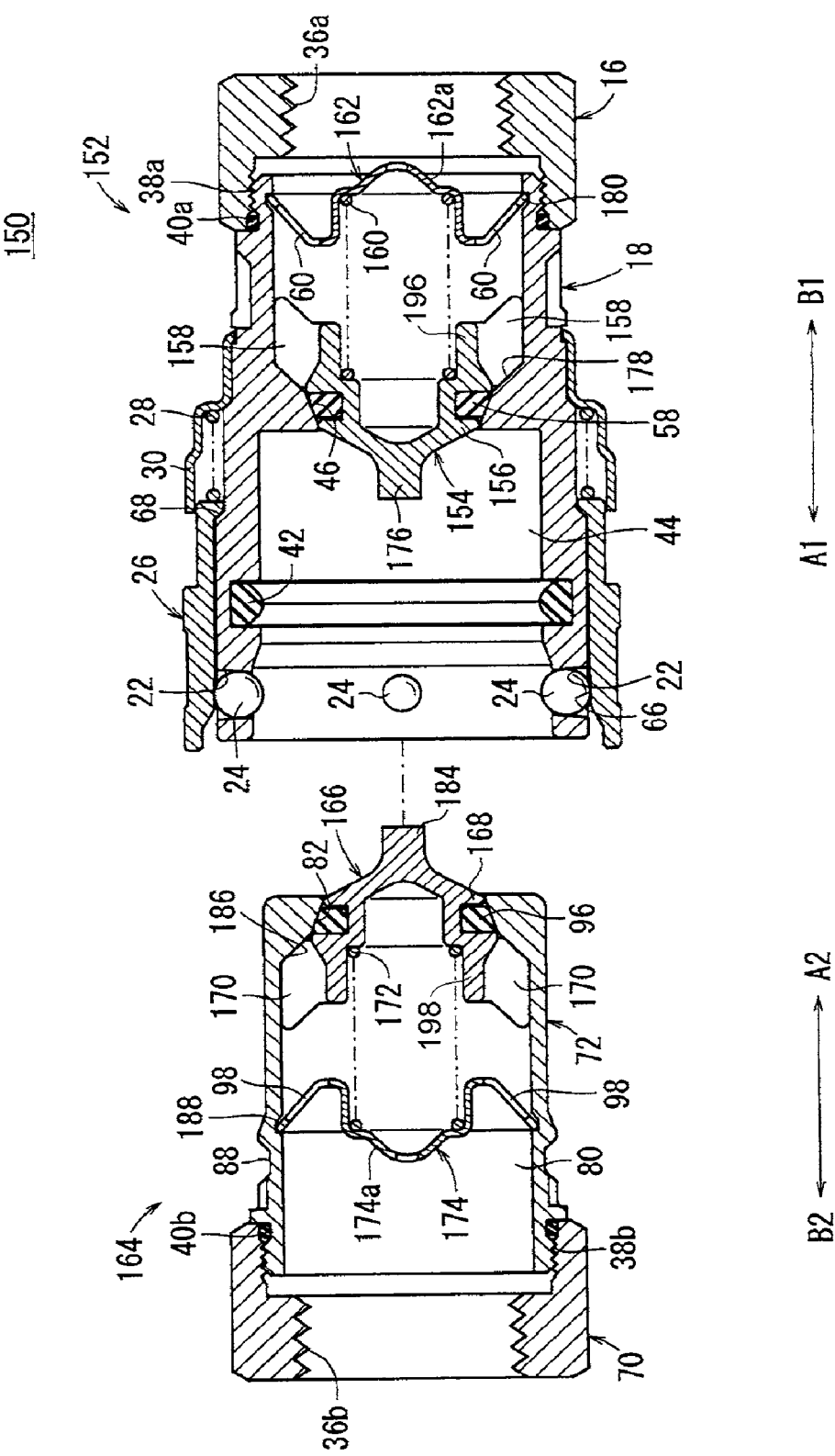
FIG. 7 is an overall vertical cross sectional view showing a detached state of a socket and plug, in the pipe joint shown in FIG. 6.

First, as shown in FIG. 2, from a detached state in which front end surfaces of each of the socket 12 and the plug 14, respectively, are separated by a predetermined distance, the socket 12 and the plug 14 are caused to mutually approach one another, whereupon the socket valve 20 that makes up the socket 12 and the plug valve 74 that makes up the plug 14 abut against each other (see FIG. 5). More specifically, as shown in FIG. 5, the end surface of the first projection 52 in the socket valve 20 is caused to abut against the end surface of the second projection 90 in the plug valve 74. When this occurs, the socket valve 20 and the plug valve 74 respectively are placed in a state wherein the first and second valve seats 46, 82 thereof are seated.

Thereupon, the front end of the plug body 72 is inserted into the first penetrating hole 44 of the socket body 18. Because the outer circumferential surface of the plug body 72 is surrounded by the seal member 42 disposed in the socket body 18, an airtight state is maintained inside the first penetrating hole 44 by the seal member 42. Further, the balls 24, outer circumferential sides of which are covered by the sleeve 26, abut against the outer circumferential surface of the plug body 72, such that the balls 24 move radially outwardly along the holes 22. In addition, the sleeve 26 is made to move toward the rear end side of the socket body 18 (in the direction of the arrow B1) in opposition to the elastic force of the sleeve spring 28, whereupon the balls 24 move toward the outer circumferential side while movement thereof is regulated by the sleeve 26.

Next, upon further approaching of the socket 12 and plug 14, the front end of the plug body 72 abuts against the end of the large diameter portion in the first penetrating hole 44, and displacement thereof is regulated, along with the annular groove 88 of the plug body 72 being positioned at the inner circumferential sides of the balls 24, whereupon the balls 24, the outer circumferential sides of which are covered by the sleeve 26, move toward the inner circumferential side through the holes 22 and engage within the annular groove 88. In this manner, the balls 24 enter into the annular groove 88 of the plug body 72 and are retained therein, and therefore the plug 14 becomes connected to the socket 12, and detachment of the socket 12 and plug 14 is prevented. More specifically, a connected state results wherein the front end side of the plug body 72 is inserted into the interior of the socket body 18.

Further, at the same time, when the socket 12 and plug 14 approach one another, the socket valve 20 and the plug valve 74, with the first and second projections 52, 90 thereof in abutment, are displaced mutually and relatively toward the rear end sides (in the directions of the arrows B1 and B2) while the first and second valve springs 32, 76 are compressed. As a result, in the socket valve 20, the first seat including the first valve packing 58 separates from the first valve seat 46, and in the plug valve 74 the second seat including the second valve packing 96 separates from the second valve seat 82, whereby the communication-interrupted state of the socket 12 and plug 14 is released, and the socket 12 and plug 14 are brought into a state of communication. Moreover, in such a state of communication, pressure fluid that flows through the interior of the conduits is maintained in an airtight state by the o-rings 40a, 40b and the seal member 42.

In this case, the socket valve 20 including the first projection 52 and the plug valve 74 including the second projection 90 are formed in substantially the same shape, and further, since the end surface of the first projection 52 and the end surface of the second projection 90 are in complete and intimate contact, the flow passage area and directivity of the pressure fluid that flows therearound is made constant, so that pressure loss of the fluid is quite small.

Next, an operation for detaching the plug 14 from the socket 12 shall be explained.

First, from the connected state of the socket 12 and plug 14 shown in FIG. 1, the sleeve 26 is moved toward the rear end of the socket body 18 (in the direction of the arrow B1) against the resilient force of the sleeve spring 28. As a result, movement of the balls 24 toward the outer circumferential side is enabled, while movement of the balls 24 is regulated by the sleeve 26. In addition, by displacement of the plug 14 in a direction (direction of the arrow B2) so as to become separated from the socket 12, the balls 24 become separated in a radial outward direction from the annular groove 88 of the plug body 72, whereupon the connected state of the socket 12 and plug 14 by the balls 24 is released.

At this time, the first projection 52 of the socket valve 20 and the second projection 90 of the plug valve 74 remain in a state of intimate contact under action of the resilient forces of the first and second valve springs 32, 76.

Next, upon further displacement of the plug 14 from the socket 12 in the direction of separation (the direction of the arrow B2), and accompanying displacement of the socket 12 and plug 14, the pressing force applied mutually to the socket valve 20 and the plug valve 74 in the direction of separation (directions of the arrows B1 and B2) gradually is lessened, and the resilient forces of the first and second valve springs 32, 76 overcome the pressing force. As a result, the socket valve 20 and the plug valve 74 are pressed respectively toward sides of the first and second valve seats 46, 82, and the first and second stoppers 54, 92 abut against and are stopped by the first and second stopper walls 48, 84. More specifically, before the socket body 18 and the plug body 72 are completely detached from each other, the socket valve 20 is seated on the first valve seat 46, and further, the plug valve 74 is seated on the second valve seat 82, and therefore, when the socket 12 and the plug 14 are completely detached, the pressure fluid does not leak out through the first and second valve seats 46, 82, which are in a valve closed state.

Further, based on the same reasoning, when the socket 12 and plug 14 are connected, the pressure fluid thereinside does not become intermixed with air from the outside.

In the aforementioned manner, in the first embodiment of the present invention, the socket 12 and plug 14 are constructed, and a state is provided wherein the socket valve 20, the plug valve 74, and the first and second spring holders 34, 78, which are disposed in the flow path of the pressure fluid, do not become a hindrance to the flow of the pressure fluid. Specifically, first and second sets of plural stoppers 54, 92 separated a predetermined interval from each other interconnect the first and second seats with the first and second skirts 56, 94 in the socket valve 20 and the plug valve 74. The pressure fluid is enabled to flow through first and second holes 60, 98 that are disposed between the first and second stoppers 54, 92 themselves. In addition, the first and second spring holders 34, 78 are installed onto the socket body 18 and the plug body 72 through the plurality of legs 62, 100, wherein the pressure fluid also is enabled to flow through first and second communication holes 64, 102 disposed between the legs 62, 100 themselves.

More specifically, together with flow of the pressure fluid introduced from the plug 14 from the second stopper wall 84 of the plug body 72 to the second valve seat 82, the pressure fluid flows while moving gradually radially inwardly, and further, together with flow of the pressure fluid from the first valve seat 46 of the socket body 18 to the first stopper wall 48, the pressure fluid flows while moving gradually radially outwardly. Further, at the same time, the pressure fluid flows along outer circumferential surfaces of the second seat including the second valve packing 96 thereof and the second projection 90 in the plug valve 74, and outer circumferential surfaces of the first seat including the first valve packing 58 thereof and the first projection 52 in the socket valve 20.

As a result, a sufficient flow passage area in the socket body 18 and the plug body 72 can be ensured, and because a structure is provided in which the flow passage of the pressure fluid is both simplified and made smoother in comparison with conventional pipe joints, upon flow of the pressure fluid, flow passage resistance can be suppressed while the pressure fluid is allowed to flow smoothly, and pressure loss can be reduced.

Further, the sleeve spring 28 that urges the sleeve 26 is arranged at the rear end (in the direction of the arrow B1) of the sleeve 26, interposed between the sleeve cover 30, which is disposed on the outer circumference of the socket body 18. As a result thereof, compared to a conventional pipe joint in which the spring is arranged on the inner circumferential side of a tubular sleeve, the outer radial dimension of the pipe joint 10 can be suppressed and, in contrast to the conventional pipe joint, a more compact size in the radial direction can be achieved.

Furthermore, the sleeve cover 30 is disposed at a region of the socket body 18 wherein the outer circumferential surface thereof is reduced in diameter, and further, at a position separated a predetermined distance from the seal member 42. Accordingly, the outer circumference of the sleeve cover 30 can be made substantially equal to the outer circumference of the sleeve 26, and the sleeve cover 30 does not make the outer radial dimension of the pipe joint 10 large in size.

In addition, as a result of disposing the sleeve cover 30 as a separate body, which can maintain the sleeve spring 28 on the outer circumferential surface of the socket body 18, in comparison with the conventional pipe joint that employs a sleeve capable of maintaining the sleeve spring, the shape of the sleeve 26 can be simplified, and further, the outer radial dimension of the sleeve 26 can be suppressed. As a result, along with reducing the size of the sleeve 26 and simplifying the manufacturing process, manufacturing costs can also be reduced.

Still further, the first and second stoppers 54, 92 are formed so as to be gradually reduced in diameter toward the sides of the first and second valve seats 46, 82, and the first and second stopper walls 48, 84, which the first and second stoppers 54, 92 abut against, similarly are formed respectively so as to be reduced in diameter toward the sides of the first and second valve seats 46, 82. Owing thereto, when the socket valve 20 and the plug valve 74 are displaced respectively toward the sides of the first and second valve seats 46, 82, the first and second stoppers 54, 92 are displaced while being guided along the first and second stopper walls 48, 84.

In greater detail, the axial centers of the socket valve 20 and the plug valve 74 are normally displaced coaxially with the axial centers of the socket body 18 and the plug body 72, wherein the socket valve 20 and the plug valve 74 can be seated onto the first and second valve seats 46, 82. Stated otherwise, deviation or shifting of the centers of the socket valve 20 and the plug valve 74 can be prevented.

As a result, the socket valve 20 and the plug valve 74 can reliably and stably be seated respectively onto the first and second valve seats 46, 82, whereby blockage of the passages by the first and second seats, which make up portions of the socket valve 20 and the plug valve 74 respectively, can reliably and stably be performed.

Still further, the socket body 18 that makes up the socket 12 and the first back body 16 that is connected to piping are constructed separately from each other, and in addition, the plug body 72 that makes up the plug 14 and the second back body 70 that is connected to piping, similarly, are constructed separately from each other. Specifically, the first and second back bodies 16, 70 are capable of being removed respectively from the socket body 18 and the plug body 72, whereby the socket valve 20 and the plug valve 74, having desired sizes, can be installed therein from the opened ends of the socket body 18 and the plug body 72. As a result, compared to a conventional pipe joint in which threads that are used for connection to the piping are provided integrally with the bodies, a socket valve 20 and plug valve 74 having desired sizes depending on the use thereof can be freely selected and installed respectively in the socket body 18 and the plug body 72, and together therewith, pressure loss of the pressure fluid can be reduced.

Next, a pipe joint 150 according to a second embodiment is shown in FIGS. 6 through 10. Structural elements thereof that are the same as those of the pipe joint 10 according to the first embodiment are designated using the same reference numerals, and detailed explanations of such features shall be omitted.

The pipe joint 150 according to the second embodiment differs from the pipe joint 10 according to the first embodiment, in that a socket valve 154 making up a socket 152 is constructed from a first seat 156 and first stoppers 158, and further, a first spring holder 162 for maintaining a first valve spring 160 therein is formed with a bottomed cylindrical shape. Further, similarly, the second embodiment also differs from the pipe joint 10 according to the first embodiment in that a plug valve 166 making up a plug 164 is constructed from a second seat 168 and second stoppers 170, and further, a second spring holder 174 for maintaining a second valve spring 172 therein is formed with a bottomed cylindrical shape.

The socket valve 154 making up the socket 152 includes the first seat 156 having a bottomed cylindrical form and which is seatable on the first valve seat 46, a first projection 176, which is reduced gradually in diameter while projecting toward the front end of the socket body 18 (in the direction of the arrow A1), and the first stoppers 158, which expand gradually in diameter from the first seat 156 toward the rear end of the socket body 18 (in the direction of the arrow B1) and which are capable of abutment against a first stopper wall 178.

The first stoppers 158 extend in the axial direction of the socket valve 154, and further, are formed with plate-like shapes being separated from each other by equal intervals along the outer circumferential surface of the socket valve 154. A plurality (for example, four) of such first stoppers 158 are provided, each of which is formed with an angle that corresponds to the angle of inclination of the first stopper wall 178.

Figure 8:
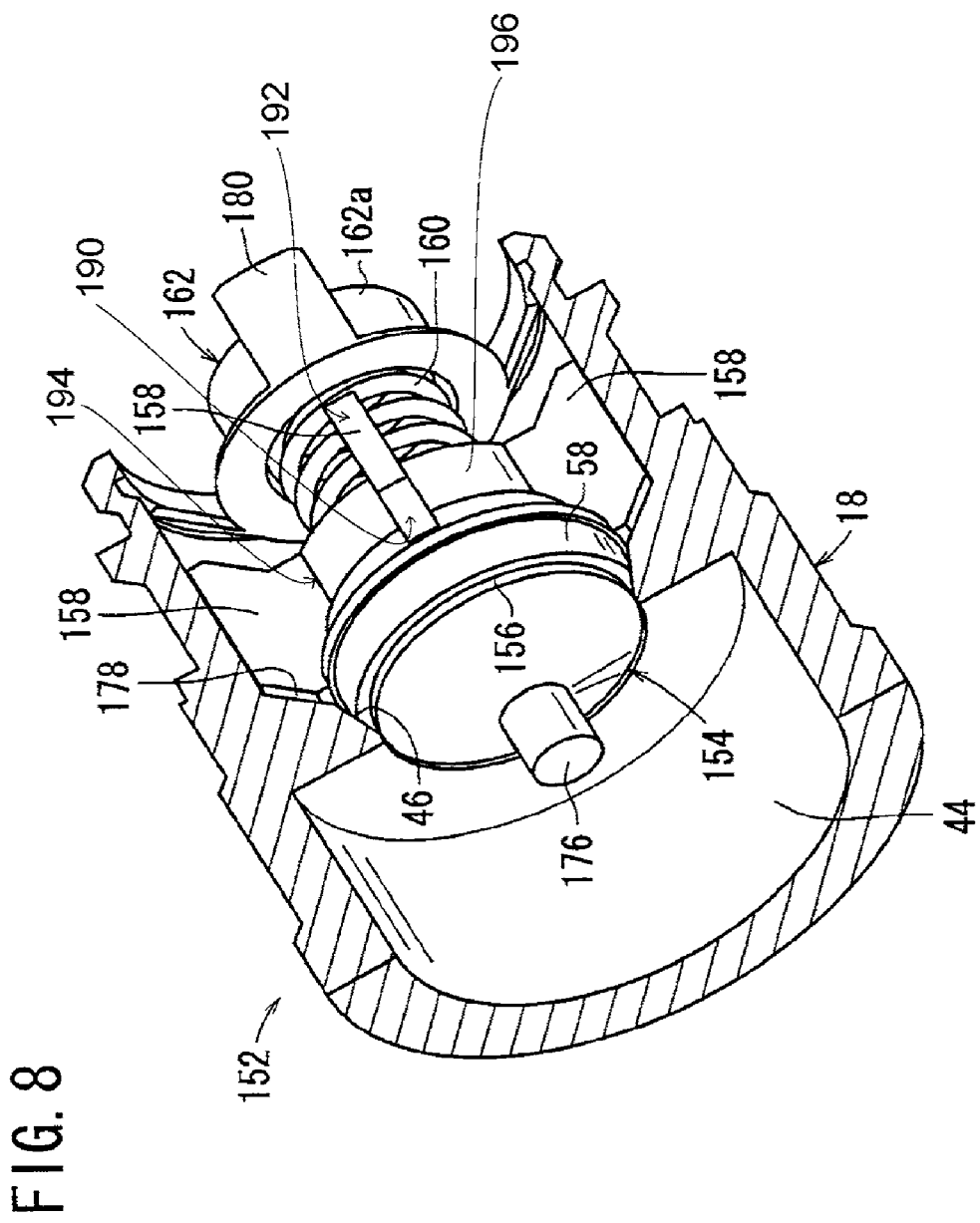
FIG. 8 is a sectional perspective view, with partial omission, of the socket shown in FIG. 7.
Figure 9:
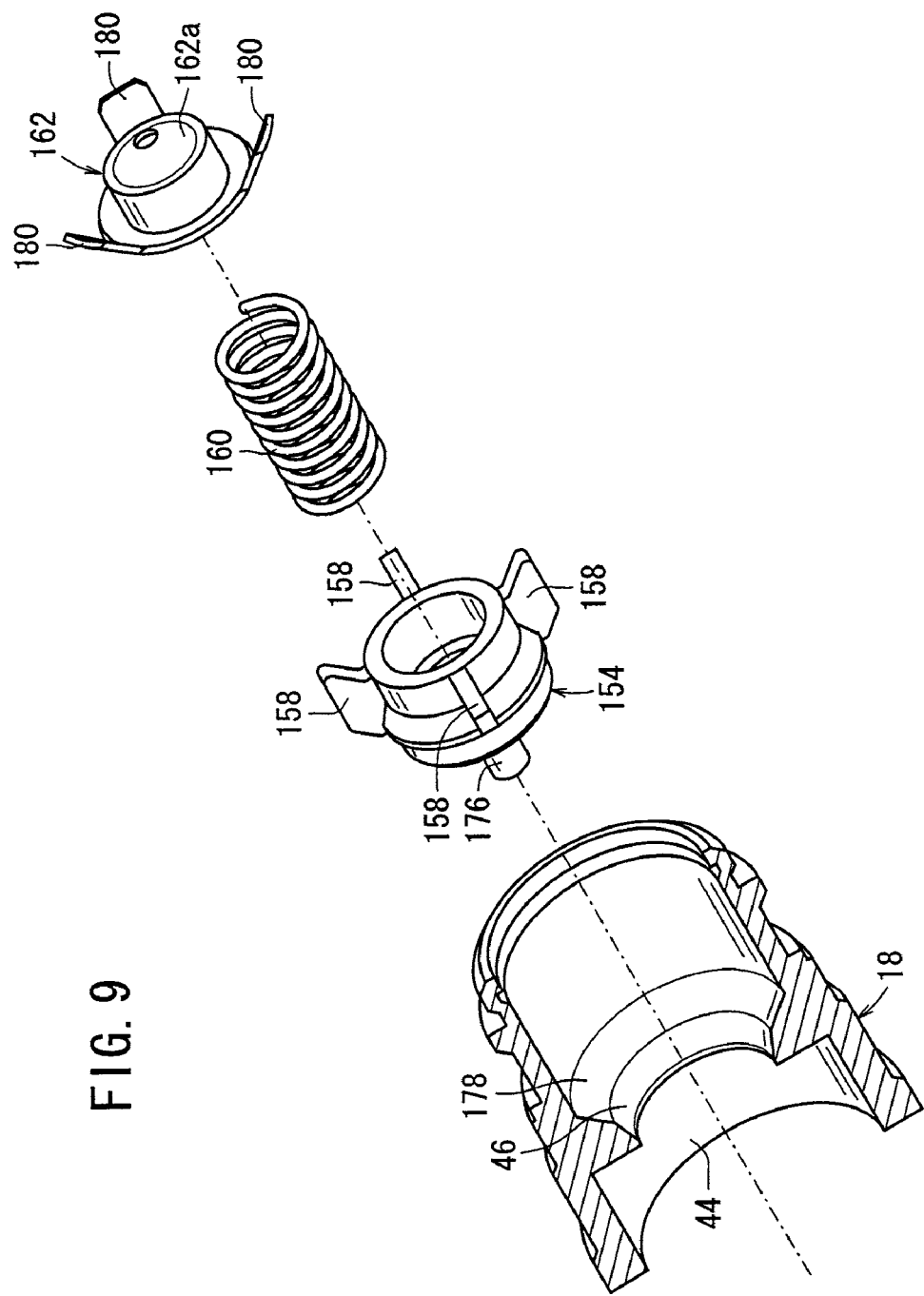
FIG. 9 is an exploded perspective view of a socket valve, a first valve spring and a first spring holder, constituting the socket shown in FIG. 7.
Figure 10:
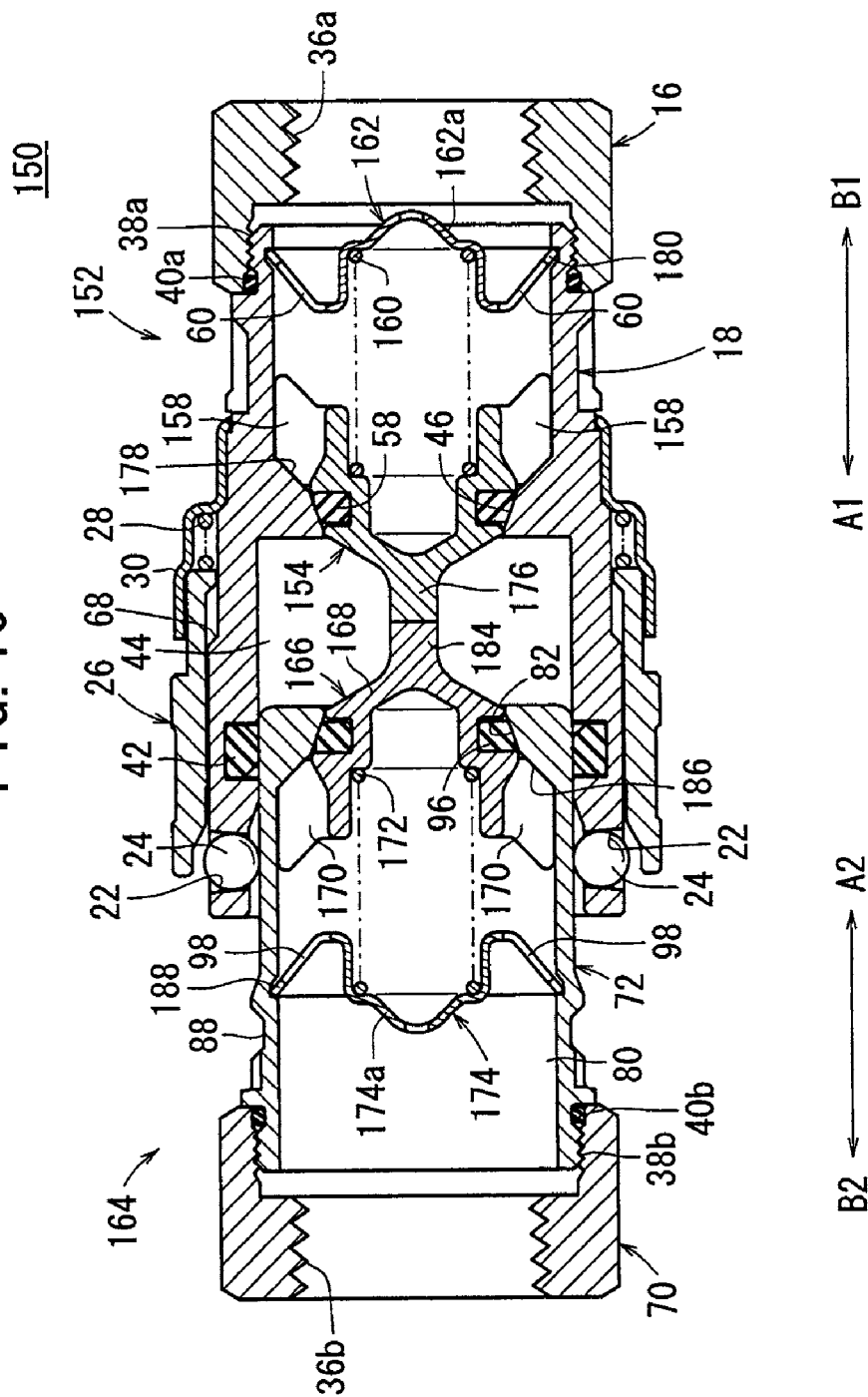
FIG. 10 is an overall vertical cross sectional view showing a state, during connection, wherein the socket and plug are moved mutually in directions to approach each other, and the socket valve and the plug valve abut against one another, in the pipe joint shown in FIG. 7.

As further shown in FIG. 8, the first stoppers 158 extend in radial outward directions as planar vanes from a cylindrically shaped skirt 196 of the socket valve 154. Each of the first stoppers 158 has an inclined edge 190 that is capable of abutment against the first stopper wall 178, such that an angle of inclination of the first stopper wall 178 corresponds to the angle of inclination of respective inclined edges 190 of each of the first stoppers 158. Further, each of the first stoppers 158 comprises a first straight edge 192 that slides against an inner circumferential wall surface of the socket body 18, and a second straight edge 194, which is attached to the cylindrically shaped skirt 196. The first straight edges remain out of contact with the cylindrically shaped skirts of the valve bodies and slide against the inner wall surfaces of the first body and the second body, the second straight edges are attached to the cylindrically shaped skirts, and respective planes of the planar vanes are disposed perpendicularly to lines tangent to the cylindrically shaped skirts.

The first spring holder 162 comprises a plurality (for example, three) legs 180 that extend radially outwardly from a main body portion 162a, which is formed with a bottomed cylindrical shape. The legs 180 engage with an inner wall surface of the first penetrating hole 44 in the socket body 18. The legs 180 expand in diameter while being inclined at a predetermined angle from a front end of the main body portion 162a on a side thereof facing the socket valve 154 toward the first back body 16 (in the direction of the arrow B1), and are disposed at predetermined intervals along the circumferential direction of the main body portion 162a.

Further, a first valve spring 160 is interposed in the main body portion 162a of the first spring holder 162, and between a connecting region of the first stoppers 158 and the first seat 156 in the socket valve 154, for thereby urging the socket valve 154 toward the first valve seat 46 (in the direction of the arrow A1).

On the other hand, the plug valve 166 making up the plug 164, similar to the aforementioned socket valve 154, includes a second seat 168 having a bottomed cylindrical form and which is seatable on a second valve seat 82, a second projection 184, which is reduced gradually in diameter while projecting toward the front end of the plug body 72 (in the direction of the arrow A2), and second stoppers 170, which expand gradually in diameter from the second seat 168 toward the rear end of the plug body 72 (in the direction of the arrow B2) and which are capable of abutment against a second stopper wall 186.

The second stoppers 170 extend in the axial direction of the plug valve 166, and further, are formed with plate-like shapes being separated from each other by equal intervals along the outer circumferential surface of the plug valve 166. A plurality (for example, four) of such second stoppers 170 are provided, each of which is formed with an angle that corresponds to the angle of inclination of the second stopper wall 186.

The second stoppers 170 have the same structure as the first stoppers 158, extending in radial outward directions as planar vanes from a cylindrically shaped skirt 198 (see FIG. 7) of the plug valve 166. Further, although not separately numbered in the drawings, each of the second stoppers 170 also has an inclined edge that is capable of abutment against the second stopper wall 186, such that an angle of inclination of the second stopper wall 186 corresponds to the angle of inclination of respective inclined edges of each of the second stoppers 170. Further, in the same manner as the first stoppers 158, each of the second stoppers 170 also comprises a first straight edge that slides against an inner circumferential wall surface of the plug body 72, and a second straight edge, which is attached to the cylindrically shaped skirt 198.

The second spring holder 174 comprises a plurality (for example, three) legs 188 that extend radially outwardly from a main body portion 174a, which is formed with a bottomed cylindrical shape. The legs 188 engage with an inner wall surface of a second penetrating hole 80 in the plug body 72. The legs 188 expand in diameter while being inclined at a predetermined angle from a front end of the main body portion 174a on a side thereof facing the plug valve 166 (in the direction of the arrow A2) toward the second back body 70 (in the direction of the arrow B2), and are disposed at predetermined intervals along the circumferential direction of the main body portion 174a.

Further, a second valve spring 172 is interposed between the main body portion 174a of the second spring holder 174 and a connecting region of the second stoppers 170 and the second seat 168 in the plug valve 166, for thereby urging the plug valve 166 toward the second valve seat 82 (in the direction of the arrow A2).

In the pipe joint 150 according to the aforementioned second embodiment as well, the same effects and advantages of the first pipe joint 10 according to the first embodiment are obtained.

The pipe joint according to the present invention is not limited to the structures of the first and second embodiments, but naturally various structures may be adopted without departing from the scope of the invention as set forth in the appended claims.

What is claimed is:

1. A pipe joint formed by a socket and a plug, which are attachable and detachable, comprising:
   a first body and a second body having flow passages therein through which a fluid flows in said socket and said plug;
   a sleeve, which is displaceably disposed on an outer circumferential surface of said first body constituting said socket, for releasing a connected state of said socket and said plug;
   a first spring disposed co-axially with said sleeve on an outer circumferential side of said first body, said first spring urging said sleeve in an axial direction;
   a pair of valve bodies displaceably disposed respectively inside of said first body and said second body, which change a communication state of said flow passages;
   valve seats disposed on inner wall surfaces of said first body and said second body, said valve seats being gradually reduced in diameter in directions separating away from said valve bodies, wherein seats of said valve bodies are seated thereon; and
   plural stoppers formed in rectangular portioned shapes respectively with respect to circumferential surfaces of said valve bodies, wherein displacement of said valve bodies is regulated by abutment of said stoppers against said inner wall surfaces of said first body and said second body,
   wherein said stoppers are gradually reduced in diameter toward sides of said seats,
   wherein communication is established between one side surface and another side surface of said valve bodies through communication holes that are constituted from said stoppers, and
   wherein said stoppers extend in radially outward directions as planar vanes from cylindrically shaped skirts of said valve bodies, each of said valve bodies having a single cylindrically shaped skirt respectively in contact with said planar vanes, said stoppers having inclined edges that are capable of abutment against first and second stopper walls of said first body and said second body, an angle of inclination of said first and second stopper walls corresponding to an angle of inclination of said inclined edges, first straight edges that remain out of contact with said cylindrically shaped skirts of said valve bodies and which slide against said inner wall surfaces of said first body and said second body, and second straight edges attached to said cylindrically shaped skirts, and wherein respective planes of said planar vanes are disposed perpendicularly to lines tangent to said cylindrically shaped skirts.

2. The pipe joint according to claim 1, wherein second springs for urging said valve bodies toward said valve seats and spring holders separated predetermined distances from said valve bodies for maintaining ends of said second springs are disposed in said first body and said second body, said spring holders having a plurality of legs projecting in radially outward directions, and further being separated from each other circumferentially by a predetermined distance, said spring holders being installed on said inner wall surfaces of said first and second bodies via said legs, first ends of said second springs being disposed on said spring holders and second ends of said second springs being disposed on respective steps of said first and second valve bodies, said second springs extending along inner circumferential wall surfaces of said cylindrically shaped skirts.

3. The pipe joint according to claim 2, wherein in said socket, a cylindrical cover member is installed on an outer circumferential side of said first body, said first spring being installed between said cover member and said sleeve.

4. The pipe joint according to claim 3, wherein said seats are gradually reduced in diameter toward said valve seats, and said valve seats are inclined at substantially the same angle corresponding to said seats.

5. The pipe joint according to claim 4, wherein connecting members, which connect pipes for supplying and discharging said pressure fluid to and from ends of said first body and said second body, are installed respectively so as to be attachable and detachable.

6. The pipe joint according to claim 3, wherein a plurality of holes are formed at an end of said first body, with balls inserted respectively into said plurality of holes, and wherein said balls are maintained and pressed toward a side of said first body by an inner wall surface of said sleeve.

7. The pipe joint according to claim 1, wherein a seal member is provided so as to face a penetrating hole disposed in said first body, said seal member sealing an outer circumferential surface of said second body when said second body is inserted into said first body.

8. The pipe joint according to claim 1, wherein said pair of valve bodies are formed by a socket valve and a plug valve, said socket valve and said plug valve respectively having projections that mutually abut against each other, and further wherein said socket valve and said plug valve have substantially the same structure.

9. The pipe joint according to claim 8, wherein the projection of said socket valve and the projection of said plug valve are arranged substantially along the same axis.

10. The pipe joint according to claim 8, said stoppers comprising first stoppers and second stoppers, wherein:
   said socket valve making up said socket is formed by a first seat and said first stoppers, and further, wherein a first spring holder that maintains a first valve spring is formed as a bottomed cylinder; and
   said plug valve making up said plug is formed by a second seat and said second stoppers, and further, wherein a second spring holder that maintains a second valve spring is formed as a bottomed cylinder.

* * * * *